S. T. CULP.
TIRE SHOE ATTACHING MEANS.
APPLICATION FILED AUG. 19, 1918.

1,294,777.

Patented Feb. 18, 1919.
2 SHEETS—SHEET 1.

Witness
H. Woodard

Inventor
Samuel T. Culp
By H. B. Wilson & Co.
Attorneys

S. T. CULP.
TIRE SHOE ATTACHING MEANS.
APPLICATION FILED AUG. 19, 1918.
1,294,777.
Patented Feb. 18, 1919.
2 SHEETS—SHEET 2.
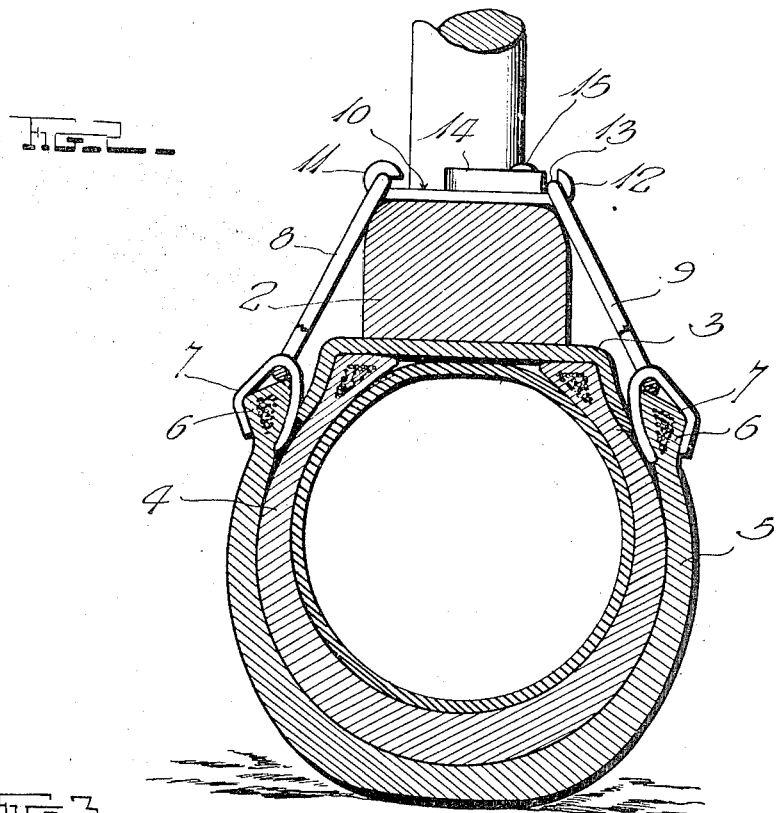
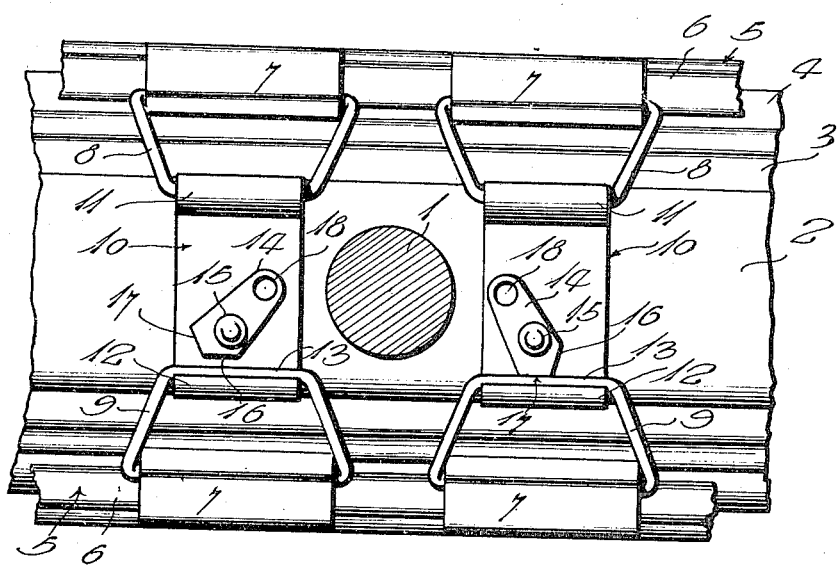
Witness
H. Woodard
Inventor
Samuel T. Culp
By H. B. Willson & Co.
Attorneys

UNITED STATES PATENT OFFICE.

SAMUEL T. CULP, OF LITTLETON, COLORADO.

TIRE-SHOE-ATTACHING MEANS.

1,294,777.          Specification of Letters Patent.     Patented Feb. 18, 1919.

Application filed August 19, 1918. Serial No. 250,565.

*To all whom it may concern:*

Be it known that I, SAMUEL T. CULP, a citizen of the United States, residing at Littleton, in the county of Arapahoe and State of Colorado, have invented certain new and useful Improvements in Tire-Shoe-Attaching Means; and I do declare the following to be a full, clear, and exact description of the invention, such as will enable others skilled in the art to which it appertains to make and use the same.

My invention has for its object to provide simple and inexpensive, yet highly efficient and durable means for clamping pieces of discarded tire casing upon the exterior of other casings so as to form wear resisting shoes for the latter, and with this object in view, the invention resides in the novel features of construction and unique combination of parts hereinafter fully described and claimed, reference being made to the accompanying drawings.

Figure 1 of the drawings is a side elevation of an automobile wheel showing the application of the invention.

Fig. 3 is a circumferential section on the plane indicated by the line 3—3 of Fig. 1, showing one of the locking dogs released and one in operative position.

Fig. 4 is a perspective view of the shoe attaching means as manufactured and placed on sale.

Figure 1:
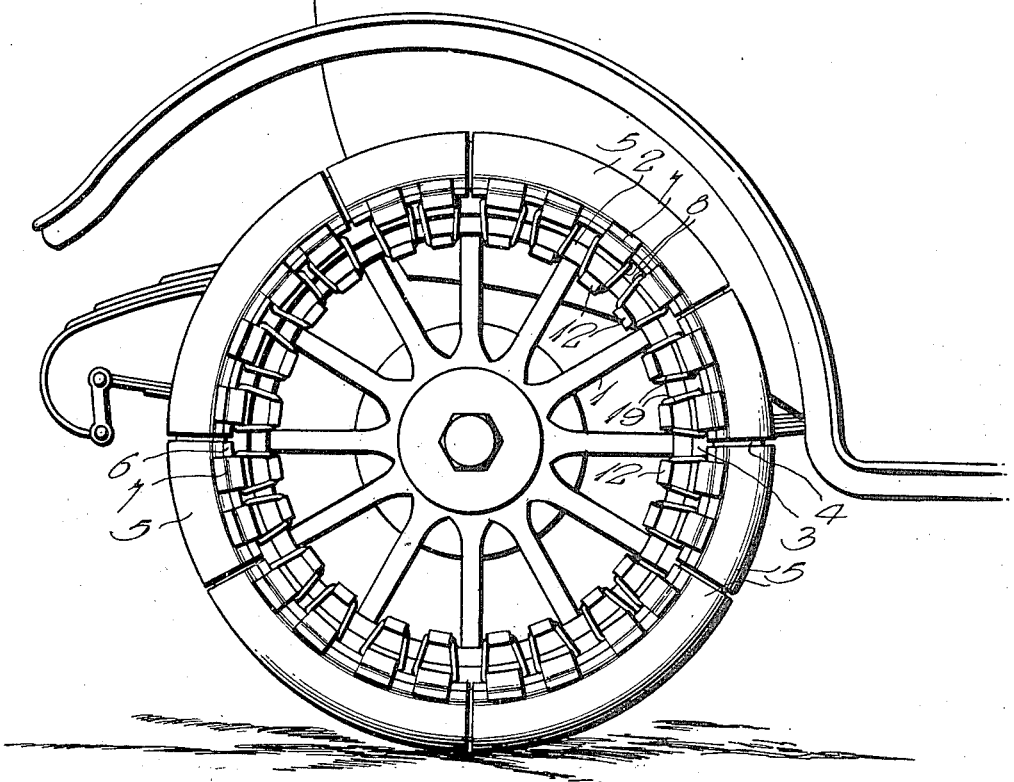
Figure 2:
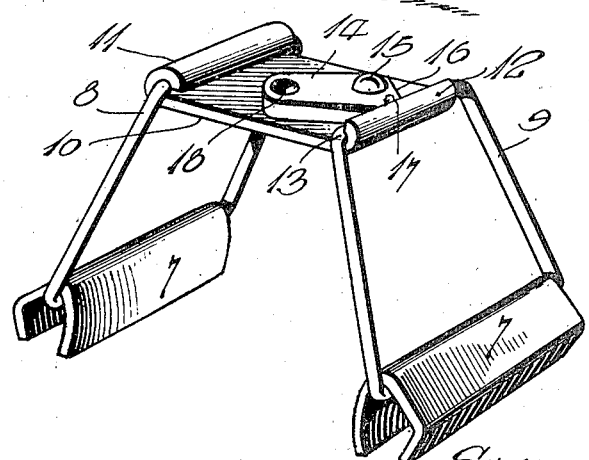
Fig. 2 is a transverse section on the plane indicated by the line 2—2 of Fig. 1.

In the drawings above briefly described, the numerals 1 designates the spokes of an automobile wheel, 2 has reference to the felly, 3 designates the rim, and 4 indicates the usual tire mounted on said rim. Disposed over the time 4 and forming wear resisting shoes therefor, are a suitable number of arcuate sections of discarded tire casings, said sections being indicated by the reference characters 5. The shoes or sections 5 are provided along their edges with the usual beads 6, and at suitable intervals, channel-shaped metal clips 7 straddle said beads, being driven tightly onto them from one end while the beads are held in a vise or the like. The clips are shaped according to the bead, whether the latter be of the straight side or clencher type. A pair of open links 8 and 9 each formed of one piece of wire with its ends welded together, have one end received longitudinally in the channels of the clips 7, between the bottoms of said channels and the beads 6. The other end of each link 8 is pivoted to a transverse plate 10, preferably by bending one end of said plate around the end of the link as seen at 11, the opposite end of said plate being somewhat similarly bent to form a hook 12 adapted to receive the free end 13 of the link 9. The inner walls of the clips 7 are curved and contact with the edges of the rim 3 rather than chafing against the tire 4; the links 8 and 9 straddle the felly 2; and the connecting plates 10 rest on the inner side of said felly, preferably in close relation with the spokes to prevent creeping of the several shoes.

By preference used in connection with the features so far described, in order to force the link ends 13 into the hooks 12 and retain them in said hooks, are locking dogs 14, said dogs being pivoted at 15 to the plates 10 adjacent the open sides of the hooks. Each dog 14 is pivoted near one end and this end is of V shape, the pivots 15 being located nearer to one side 16 of the V than to the other side which is designated at 17. When the dogs are turned upon their pivots until their sides 16 are parallel with the hooks 12, the link ends 13 may be removed from said hooks, but when the dogs are forced in the opposite direction beyond dead center, so that the sides 17 of their V shaped ends contact with the link ends, the latter are effectively held in place. The free end of each dog is preferably provided with a socket 18 to receive a suitable tool for turning said dogs as required. The links 9 are most easily disengaged from the hooks 12 when the tire is deflated and flattened by the weight of the machine, it being then only necessary to insert a suitable sharp tool between the link end 13 and the hook 12, to pry the former from the latter, provided of course that the dogs 14 have first been released. In engaging the links with the hooks, any suitable lever may be provided, this lever being passed through the link and over the bill of the hook, so that by prying upwardly upon the lever and striking the link a blow with a hammer or the like, it will slide down the lever into engagement with the hook.

The invention is preferably placed on sale in the form shown in Fig. 4, that is detached from the shoe with the clips 7 of suitable shape and size to permit them to be driven onto the heads of the shoe which may be formed by the purchaser from an old discarded casing.

From the foregoing, taken in connection with the accompanying drawings it will be obvious that although my invention is of extremely simple and inexpensive nature, it will be highly efficient and in every way desirable, particular emphasis being laid upon the fact that the device permits the use of discarded casings to protect the tires. It is also of great advantage that the device is so constructed as to permit it to be applied to old shoes by the purchaser, without requiring skilled labor of any character.

Since probably the best results are obtained from the details shown and described, they are by preference followed, but within the scope of the invention as claimed, considerable latitude is allowed for making such changes as occasion may dictate.

I claim:

1. In combination with a tire shoe having beads along its edges, a one-piece channel-shaped metal clip straddling and tightly gripping each bead, and clip connecting means whose ends pass through the channels of said clips between the bottoms of said channels and said beads, said connecting means being adapted for passage across the wheel felly.

2. In combination with a tire shoe having beads along its edges, a one-piece, channel-shaped, metal clip straddling and tightly gripping each bead, links having one end passing longitudinally through the channels of said clips between the bottoms of said channels and said beads, and clamping means connecting said links and adapted for passage across the wheel felly.

3. Attaching means for tire shoes, consisting of a pair of one-piece channel-shaped metal clips to be driven onto the beads along the edges of the shoe, and connecting means extending between the two clips with their ends located in the bottoms of the clip channels, said connecting means being adapted for passage across the wheel felly.

4. Attaching means for tire shoes, consisting of a pair of one-piece channel-shaped metal clips to be driven onto beads along the edges of the shoe, a pair of links having one end passing longitudinally through the channels of said clips, at the bottoms thereof, and clamping means connecting said links and adapted for passage across the wheel felly.

5. In combination with a tire shoe, a link connected to one edge of said shoe and a transverse plate pivoted to said link for passage across the wheel felly, a link connected to the other edge of said shoe, the free end of said plate having a hook to receive the free end of said link, and a locking dog pivoted to said plate adjacent said hook and adapted when turned upon its pivot, to force said link end into and retain it in said hook.

6. A structure as specified in claim 5, said locking dog having a V shaped end for holding said link end, the pivot of said dog being disposed nearer to one side of the V than to the other, for the purpose specified.

In testimony whereof I have hereunto set my hand.

SAMUEL T. CULP.